S. G. FYFE.
MACHINE FOR SURGICAL AND ORAL CLEANING.
APPLICATION FILED APR. 4, 1912.
1,065,351.
Patented June 24, 1913.
2 SHEETS—SHEET 1.
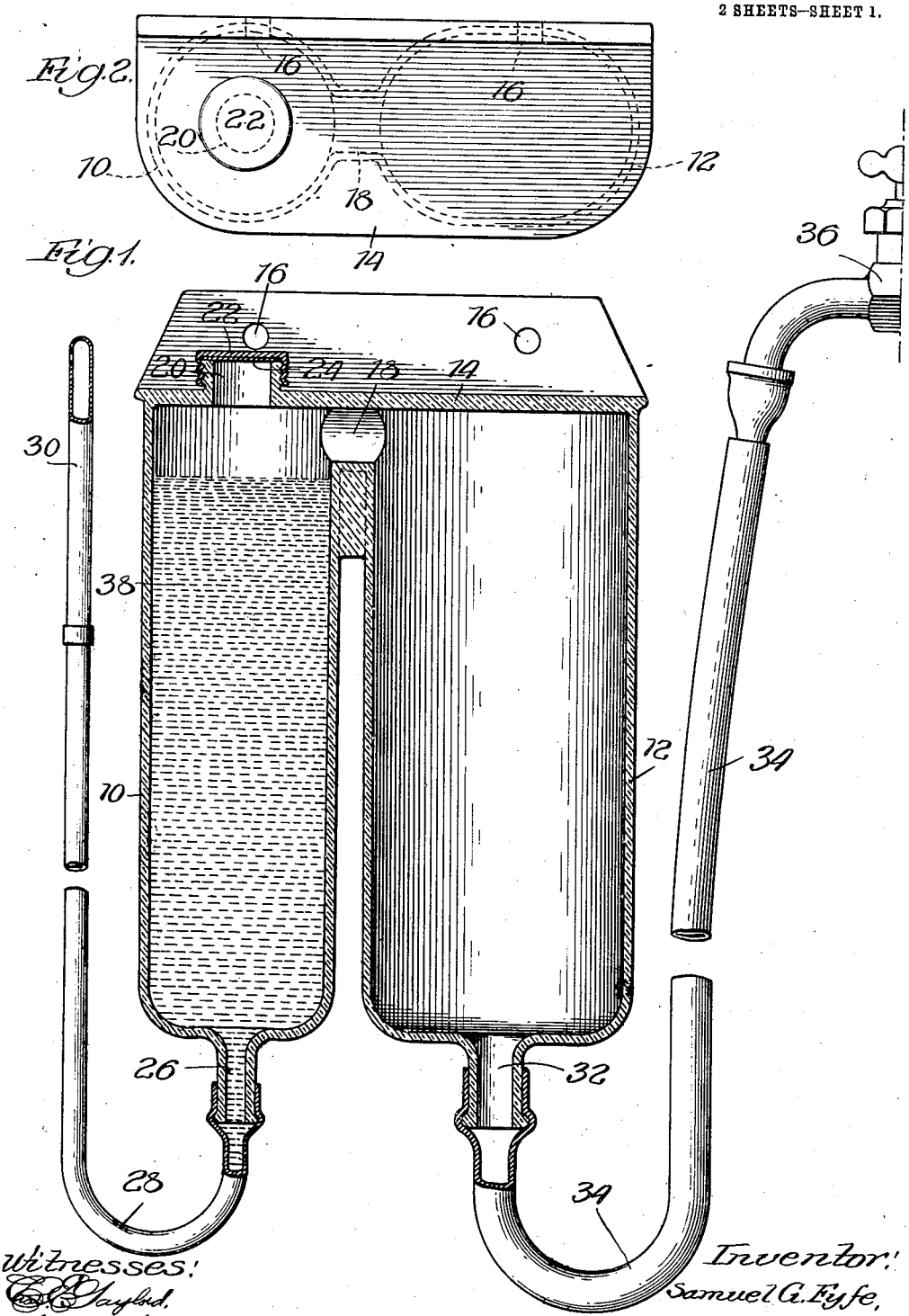

S. G. FYFE.
MACHINE FOR SURGICAL AND ORAL CLEANING.
APPLICATION FILED APR. 4, 1912.
1,065,351.
Patented June 24, 1913.
2 SHEETS—SHEET 2.
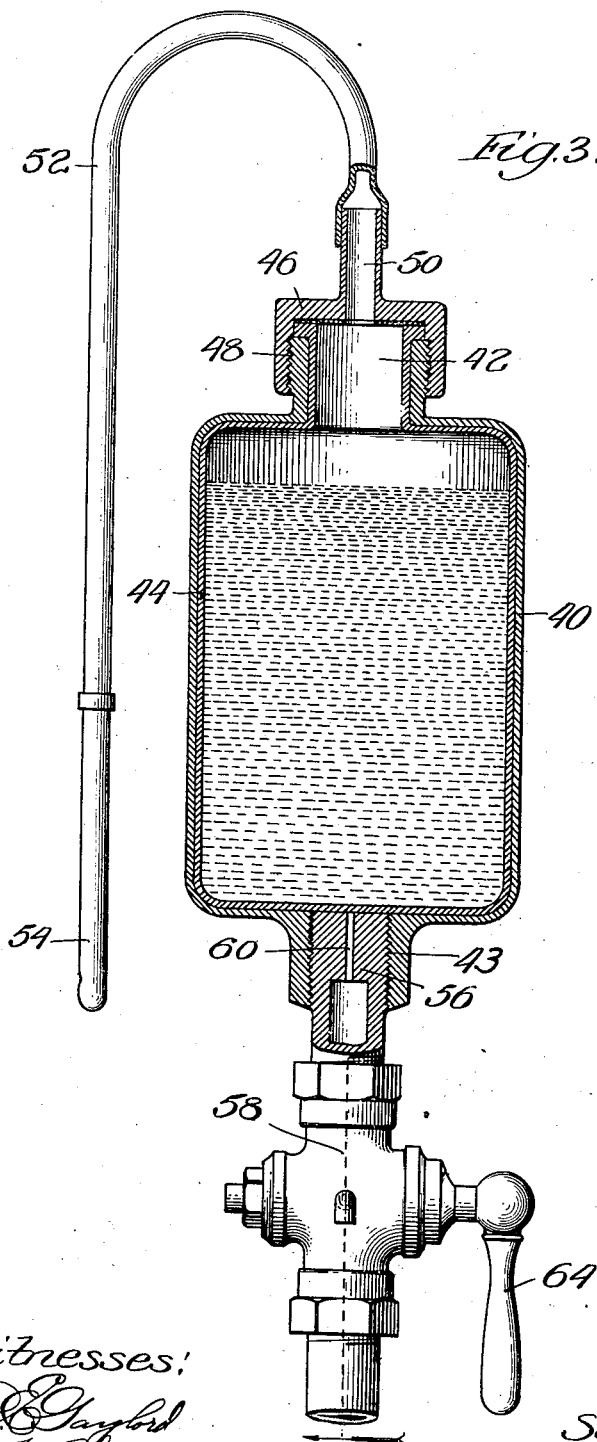
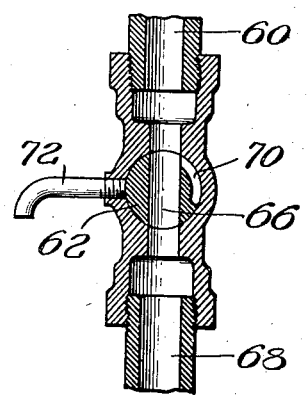

UNITED STATES PATENT OFFICE.

SAMUEL G. FYFE, OF WAUKEGAN, ILLINOIS, ASSIGNOR OF ONE-HALF TO OTTO B. SMITH, OF WAUKEGAN, ILLINOIS.

MACHINE FOR SURGICAL AND ORAL CLEANING.

1,065,351.  Specification of Letters Patent.  Patented June 24, 1913.

Application filed April 4, 1912. Serial No. 688,502.

*To all whom it may concern:*

Be it known that I, SAMUEL G. FYFE, a citizen of the United States, residing at Waukegan, in the county of Lake and State of Illinois, have invented a certain new and useful Improvement in Machines for Surgical and Oral Cleaning, of which the following is a specification.

This invention is a device or machine for supplying antiseptic solution under pressure for use in surgical or oral cleaning.

The object of the invention is to provide a device of this character which will force the antiseptic solution to the points desired, the quantity of solution in the machine being visible so that the pressure may be shut off when the supply is exhausted.

A particular object of the invention is to provide such a device which can be readily cleaned, filled and discharged.

The invention consists in a device capable of carrying out the foregoing objects which can be easily and cheaply made and installed, which is satisfactory in operation, and not readily liable to get out of order.

It further consists in the details and combinations of parts which will be hereafter set forth in the specification and claims.

Referring to the figures, in which similar numerals indicate the same parts throughout the several views; Figure 1 is a sectional front view of one form of mechanism illustrating this invention in its preferred form. Fig. 2 is a plan view of the essential parts of Fig. 1. Fig. 3 is a sectional detail front view of a modified form of the device. Fig. 4 is a sectional detail view on the line 4 of Fig. 3 showing a stop cock for draining the device of Fig. 3.

In the preferred form of device illustrated in Fig. 1, the receptacle, preferably made of glass, is formed with two adjacent receptacles 10 and 12 each secured to a bracket 14 attachable by means of screws or the like passed through holes 16 to a wall of the room or other suitable support. In the particular form here illustrated, the bracket and the receptacle are cast or blown in one piece of glass but they may be obviously made separately and attached together by ordinary means without departing from this invention. The upper ends of the two receptacles are connected together by a port or passageway 18 so that liquid or gas may freely pass from one receptacle to the other.

The receptacle 10, which is designed for the antiseptic solution, may be reached by an entrance port 20 closed by a screw cap or the like 22 of any suitable construction. In the device here illustrated, a rubber washer 24 is provided to prevent leakage. In the bottom of receptacle 10 is a port or passageway 26 to which is attached a delivery tube or pipe 28 terminating in nozzle 30 of any suitable form designed to deliver liquid at the point desired for use. In the bottom of receptacle 12 is a port or passageway 32 having connected to it a pipe 34 leading to a faucet, valve 36 or other suitable device controlling the admission of ordinary water or gas under pressure, the same being supplied from a suitable source, not shown. In the operation of this form of the machine, antiseptic solution 38 is placed in receptacle 10 preferably through the opening 20 and the receptacle 12 is left empty. When now it is desired to apply this antiseptic solution in the practice of surgery, dentistry, or the like, the operator opens the valve 36 and admits the pressure liquid through the pipe 34 into the chamber 12, up which it flows, compressing somewhat the air within that chamber, thence through passageway 18 into the chamber 10; in so doing, forcing out of the pipe 28 and the nozzle 30 the antiseptic solution 38. Owing to the presence of air in the chamber 10 when the operation begins there is always a large air bubble between the antiseptic solution 38 and the water delivered through pipe 34, with the result that the surgeon, dentist, or other operator using the device can always, by looking at the device, see when the antiseptic solution 38 has all passed out of the chamber 10, and thus shut off the valve 36 to prevent ordinary water or other pressure liquid from following the antiseptic solution out into contact with the part which is being treated with or by the solution 38. When the antiseptic solution has nearly, or wholly passed out of the device, the nozzle is placed at a point where a free discharge can be obtained, and the pressure liquid passing up through pipe 28 serves to completely flush both chambers 10 and 12. After this has taken place, the connection at valve 36 is detached, which allows all liquid to drain freely out of both chambers. After this has taken place, pipes 28 and 34 may be replaced and the operation repeated.

It is obvious that if, for any reason, it is not desirable or convenient to fill receptacle 10 through opening 20 the solution may be sucked into this receptacle by attaching an ordinary siphon or other suction pump to discharge port 32 and simultaneously immersing either opening 26 or pipe 28 in the solution which is to be drawn into the device. By the use of this device, great pressure may, if desired, be applied to the solution 38, thereby rendering it very efficient in cleansing, this without its being necessary for the operator to manually operate a power syringe or the like.

Referring now to the modified form of the device shown in Fig. 3, a chamber 40, preferably of transparent material, such as glass, is provided, having at one end a discharge opening 42 and at the other end an entrance port 43. Inside this receptacle 40, and having but one opening (that through the discharge port 42) is a bag or sack 44 of rubber or other compressible material. This bag should closely fit the walls of the receptacle 40, as shown. Over the end of discharge passageway 42 of both receptacles 40 and sack 44 is a cap 46 engaging the receptacle 40 in screw threads 48. This cap has a discharge passageway 50 to which is fitted a pipe 52 leading to a nozzle 54 of any suitable construction, the same being designed to be used for the same purposes as nozzle 30 heretofore referred to. Screw threaded into passageway 43 heretofore referred to is a plug 56 also connected at its opposite end to valve casing 58. Through this plug 56 is a passageway 60, as shown, leading up to and into contact with the sack 44 heretofore referred to. Rotatably mounted in valve casing 58 is a valve member 62 operated by a handle 64 having through it a main passageway 66 adapted to connect passageway 60 heretofore referred to, with a pipe 68, through which is supplied water or gas under pressure as in the preferred form of the device. Valve member 62 has a circumferential passageway 70 adapted, when the valve member 62 is moved through ninety degrees from the position shown in Fig. 4, to connect passageway 60 with discharge pipe 72. In the operation of this form of the device, the cap 46 is removed, the sack 44 is filled with antiseptic solution, whereupon the cap 46 is replaced in the position shown in Fig. 3. The operator then turns valve 62 to the position shown in Fig. 4, thereby admitting liquid under pressure through the pipe 68 to the bottom of sack 44, which liquid under pressure forces the bottom of the sack upward and thus forces the antiseptic solution within the sack out through nozzle 54. When all of this liquid has been expelled, the operator closes the valve 62 in the ordinary manner, and in so doing turns passageway 70 into connection with passageway 60 and pipe 72, with the result that compressing liquid which was forced into receptacle 40 between sack 44 and the walls of receptacle 40 drains out through pipe 72, thereby removing all pressure from the underside of sack 44 and allowing it to return to normal position of Fig. 3, whereupon new antiseptic solution may be inserted and the operation repeated.

It is to be noted that in the preferred form of the device, the passageway 18 is much smaller than the circumferential area of solution chamber 10 and that in the modified form of the device the passageway 60 is much smaller than the capacity of the sack 44, the result in each case being that the antiseptic solution is forced out more slowly than it would be were the direct pressure of the forcing liquid applied to the antiseptic solution receptacle in an area equal in size to the receptacle itself.

The claims are:—

1. In a device of the class described, the combination of two adjacent receptacles connected together near their tops by a passageway of a less diameter than the diameter of either of the two receptacles, one of said receptacles being provided with a discharge port near its bottom and a closable port near its top through which antiseptic liquid may be inserted, the other of said receptacles being provided with an entrance port near its bottom, the whole in combination with means for supporting the device and for supplying liquid under pressure to the last mentioned entrance port for the purposes set forth.

2. In a device of the class described, a bracket adapted to be secured to a fixed support, two adjacent receptacles suspended from said bracket connected together near their tops by a passageway, a discharge port near the bottom of one of the receptacles, an entrance port near the bottom of the other receptacle, and means for conducting liquid under pressure into said entrance port, for the purposes specified.

In witness whereof, I have hereunto subscribed my name in the presence of two witnesses.

SAMUEL G. FYFE.

Witnesses:
 OTTO B. SMITH,
 DWIGHT B. CHEEVER.